United States Patent Office

3,509,275
Patented Apr. 28, 1970

3,509,275
AUTOMATIC FOCUSING OF ELECTRON MICROSCOPES
Edward M. Deeley, Strand, London, and Claude D. Curling, Hayes, Kent, England, and John A. Temple, Hatfield, Pretoria, Republic of South Africa, assignors to Associated Electrical Industries Limited, London, England, a British company
Filed May 31, 1967, Ser. No. 642,379
Int. Cl. H01f *37/26, 29/56*
U.S. Cl. 178—6.8      14 Claims

ABSTRACT OF THE DISCLOSURE

A filtered output signal is obtained having two maxima when an electron image is moved through focus. Focusing current is adjusted until the filtered signal reaches a minimum between the two maxima.

BACKGROUND OF THE INVENTION

(1) Field of the invention

This invention relates to electron microscopes and, more particularly, to focusing such microscopes.

(2) Description of the prior art

When an image is scanned to produce an output signal varying in accordance with image density, abrupt changes in density corresponding to the edges of sharply defined images will cause high frequency harmonic components to appear in the output signal. It has been proposed to focus electron microscopes by periodically moving the electron images relative to an electron collector and filtering out a narrow frequency band in the range of the highest anticipated harmonic from the resulting output signal. We have found, however, that in practice seeking a maximum in this range does not necessarily lead to the position of best focus. On of the reasons for this is that the signal-to-noise ratio is poor in this range. The highest frequency components are due to phase contracts effects and in fact there are two maxima for these components, one on each side of the position of best focus, and with a poorly defined signal these are likely to merge and form a single plateau passing through, but not defining, a position of best focus.

SUMMARY OF THE INVENTION

According to the present invention we select a frequency band within the range of 35–75% of the upper cut-off frequency to obtain a filtered output signal with two clearly defined maxima as the image is moved through focus, and the microscope is then focused by adjusting a focusing current until the filtered signal reaches an extreme value representing a minimum between the two maxima. A preferred frequency band of the filter is within the range from 40–60% of the upper cut-off frequency. The actual frequency content of the signal will depend on the thickness and density of the specimen under observation. The scanning of the image is preferably carried out by the electron beam of a Vidicon tube with a target of the "storage kind" either built into the final image plane of the microscope or alternatively positioned in an image plane following an optical link inserted between the fluorescent screen of the microscope and the tube.

The upper cut-off frequency may be calculated using a well-know formula given later in the specification.

Once the filtered signal has been obtained it may either be used directly to give an indication of the state of focus or alternatively it may control the functioning of an automatic electronic focus control circuit responsive to the amplitude of the signal.

BRIEF DESCRIPTION OF THE DRAWING

A preferred embodiment of the invention will now be described by way of example with reference to the accompanying drawings, in which.

DESCRIPTION OF THE PREFERRED EMBODIMENT

Figure 1:
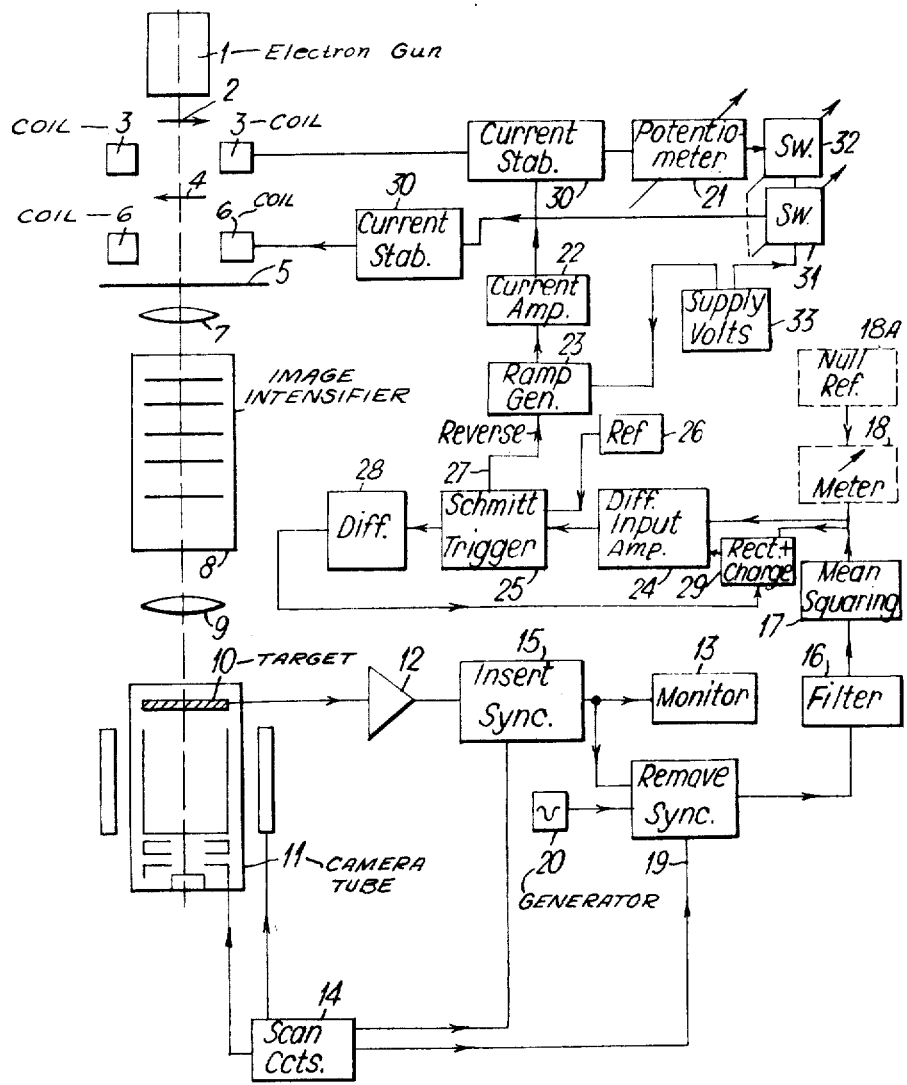
FIGURE 1 is a block circuit diagram of a focus control system for an electron microscope including focusing means embodying the invention.

Referring to FIGURE 1, electrons from an electron gun 1 fall on an object 2 and thereafter pass through magnetic coils 3 which constitute the objective lens of an electron microscope to produce a first image in the plane 4. This image is subsequently magnified and projected on to the fluorescent screen 5 of the microscope by magnetic projection lens coils 6. The resulting optical image passes through an objective lens 7 onto the first plate of an image intensifier 8, which may be, for example, of the type described in British Patent No. 887,517, where the intensification is produced by a cascade effect from a stack of spaced discs having photosensitive fluorescent surfaces backed by electron emissive surfaces.

The final intensified fluorescent image is projected by a lens 9 onto a photoconductive taget 10 of a television camera tube such as a Vidicon tube 11. As the target located within the microscope vacuum tube is scanned by an electron beam, a signal representing changes in image density will thus be generated and this signal is passed to an amplifier 12. The signal can be viewed on a television monitor 13 provided synchronizing pulses are inserted corresponding to the scanning of the target, and a connection therefore extends from scan circuits 14 controlling the electron beam of the Vidicon tube to a junction box 15.

When the image projected on the target 10 is sharply in focus, the abrupt changes in density at the edges of the image introduce high frequency harmonic components into the output signal from the target. The signal is therefore filtered by a band-pass filter 16 with a frequency pass band in the range of 35–75% of the highest anticipated harmonic component, and the filtered signal is passed to a conventional mean squaring or average detector circuit 17. The upper cut-off frequency is calculated using the formula $$\rho = \frac{A}{2}\left[\frac{L-S_\mathrm{p}}{t_1-S_1}\right]$$

where:

A = aspect ratio
L = scanning lines
$S_\mathrm{p}$ = lines used for flyback blanking
$t_1$ = time to scan one line
$S_1$ = time blanking period As previously described, the resulting signal is characterised by two distinct maxima as the image is moved through a position of focus, one on either side of the focused position. The synchronizing pulses inserted at the junction 15 also contain high frequency components which would distort the shape of the filtered waveform if allowed to pass through the filter. These are therefore removed by gating out the signal from the target during the synchronizing pulses by means of a gating signal obtained from the scan circuit 14 applied through the line 19. The subsequent gap in the signal is bridged by a portion of a sine wave from the output of a waveform generator 20 which is normally blocked when no gating signal is present.

The microscope is therefore set initially to an approximately focused condition, by adjusting a potentiometer 21 such that the output signal will lie somewhere between the two maxima. To achieve complete focus it remains to adjust the current flowing through the objective lens coils 3 until the signal reaches a minimum (or a maximum, if the signal has been inverted). As mentioned previously, this can be done either manually by an operator observing an indicator or by an automatic focus control circuit. For indicator operation, the final adjustment is carried out manually using the potentiometer 21, and by an operator observing the output from the mean squaring circuit on a meter 18, the sensitivity of which can be increased by backing off the standing reading with a reference potential 18A. Hence the current flowing through the coils is varied until the meter indicates a minimum.

In the case of automatic focus control where the adjustment of focus is made continuously from one side of focus to the other, a ramp waveform from a generator 23 is applied to the input of a current amplifier 22, the slope of the ramp being reversed whenever the output from the mean squaring circuit 17 reaches predetermined limits.

Normally, the output from the mean squaring circuit 17 is inverted and applied to the two inputs of a differential input amplifier 24, and a rectifier and charging circuit 29 is included in one of the input paths. The output from the differential input pair is applied to a Schmitt trigger circuit 25 together with a reference voltage from a source 26. When the charging circuit has been fully charged and the inverted output signal from the mean squaring circuit commences to fall as the image is moved passed focus, the output from the differential input amplifier 24 exceeds the Schmitt trigger threshold voltage and the bistable circuit therefore changes state. The resulting positive step is applied along the path 27 as a triggering pulse to reverse the slope of the ramp waveform being generated by the ramp generator 23. Thus the rate of change of current flowing in the objective lens coils 3 is reversed and the image is brought back towards focus. The leading edge of the Schmitt trigger pulse is differentiated by the differentiating circuit 28 and the resulting pulse is used to reset the charging circuit 29. The output from the differential input amplifier 24 thus falls below the required threshold value and terminates the pulse from the Schmitt trigger 25. The trailing edge of the pulse however does not act as a triggering pulse for the ramp generator and, although it is differentiated by the circuit 28, the reset pulse is blocked by a rectifier in the circuit 29. Hence the cycle is repeated again as the system moves towards focus with the inverted output signal from the mean squaring circuit 17 rising and thereby charging the charging circuit 29.

Current stabilisers 30 are provided in the paths to the electron microscope coils to prevent variations in the current due to stray effects.

Variations in the magnification of the image are obtained by altering the switch 31 and thereby changing the current to the magnification coils 6. A change in the magnification of an electron microscope, however, also produces a change in focus which could be sufficient to defocus the image to such an extent that it no longer fell between the two maxima. To overcome this difficulty we gang the switch 31 to a switch 32 and thus provide a corresponding adjustment of the focusing current from the supply 33 whenever the magnification current is altered. This is of particular importance when the microscope is under automatic control.

Figure 2:
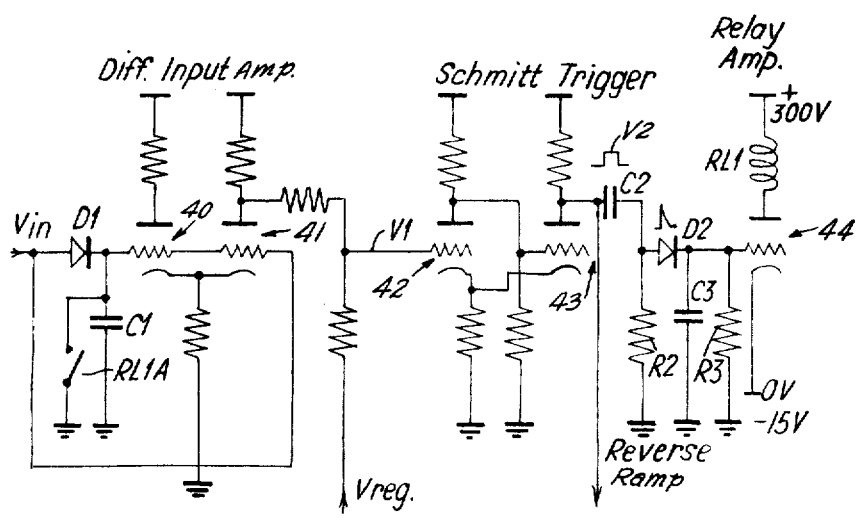
FIGURE 2 is a circuit diagram of those parts of the block diagram in FIGURE 1 which are used for automatic focus control.

FIGURE 2 is a circuit diagram of that part of the automatic control circuit shown in FIGURE 1 between the output from the mean squaring circuit 17 and the trigger input to the ramp generator 23. The operation of the circuit is as follows:

Capacitor C1 is charged positively through a diode D1 and follows the positive excursions of the input voltage V$in$ from the mean squaring circuit 17, and the potentials of the two grids of triodes 40, 41 in the conventional differential input amplifier 24 remain equal. With the differential input implifier 24 in this balanced state, the potential V1 remains low and is set by a reference potential V$ref$ applied to the plate of the triode 41. As the input voltage V$in$ starts falling the voltage across the capacitor C1 stays at a maximum value so that the potential V1 rises above the trigger threshold level of the conventional Schmitt trigger comprising triodes 42, 43, and produces a rapid rise of the output voltage V2 at the plate of the triode 43. A capacitor C2, and a resistor R2 differentiate this leading edge which passes through a diode D2 to charge a capacitor C3 positively, thus causing a relay amplifier 44 to conduct and energize a relay coil RL1. The positive step V2 also acts as a triggering pulse to reverse the slope of the ramp wave generator 23. The energization of the relay coil RL1 closes a relay contact RL1A for a time determined by the discharge time constant of the capacitor C3 and the resistor R3. Since the capacitor C1 is shorted, the input amplifier returns to its balanced state, and hence the potential V1, and therefore trigger output voltage V2, fall rapidly to their original state. The negative going step V2 is differentiated, but blocked by the diode D2 and hence when the relay contact RL1A opens the cycle starts again.

Since there is some lag between the change in the potential V$in$ and the actual focus change generated by the ramp wave, the time constant of the capacitor C3 and the resistor R3 is chosen to be just greater than this lag.

Figure 3:
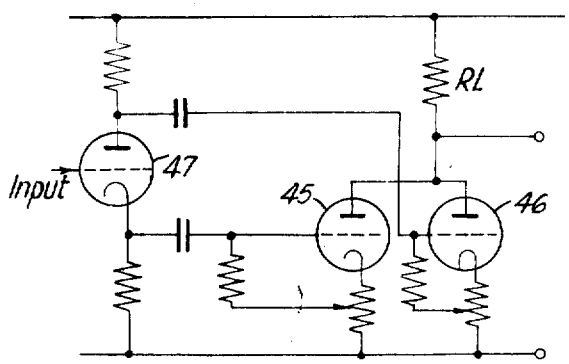
FIGURE 3 is a circuit diagram of the mean squaring circuit of FIGURE 1.

In the circuit diagram of the conventional mean squaring circuit shown in FIGURE 3, the grids of triodes 45 and 46 are fed in phase opposition from the cathode and anode of a triode 47, respectively. Hence, a common load RL for the triodes 45, 46 is fed with the square of an input voltage from the filter 16 so that negative half cycles vanish.

Typical values for the frequency band of the filter will depend on the resolution obtainable. With the definition of the image corresponding to that obtained with a 625 line television raster, the upper cut-off frequency of the output signal will be approximately 6 mc./s. and hence in this case the filter would preferably have a frequency band lying within the range of 2.4–3.6 mc./s., that is, 40–60% of the upper cutoff frequency of the output signal.

What is claimed is:

1. Focusing means for an electron microscope comprising:
   (a) means for varying focusing current to bring said microscope into and out of focus;
   (b) means for scanning element by element at least a portion of a final electron image to obtain a signal representing densities of successively scanned elements; and
   (c) a band-pass filter connected to receive said signal and having a frequency pass band lying within a range of 35–75% of the upper cut-off frequency of said signal to produce a filtered signal having two distinct maxima as said image is moved through focus whereby said electron microscope may be focused by adjusting said current varying means until said filtered signal reaches an extreme value representing a minimum between said two maxima.

2. Focusing means according to claim 1, in which said microscope includes focusing coils, and in which said means for varying focusing current comprises a current amplifier having an input, a ramp waveform generator connected to the said input for generating a ramp current to modify said current flowing through said focusing coils, means for initially adjusting focus to lie between the said two maxima, and means for reversing the slope of the ramp waveform whenever the amplitude of said filtered signal rises to a predetermined level above said minimum whereby said focus of said image is automatically controlled by said current flowing in the focusing coils hunting about a means value corresponding to a position of best focus.

3. Focusing means according to claim 1 including switching means for changing magnification of said image and simultaneously adjusting said focusing current to compensate for the resulting change in focus, whereby if the focus has been initially adjusted to lie between said two maxima it continues to lie therebetween after a change of magnification.

4. Focusing means according to claim 2, in which said means for reversing said slope of said ramp waveform includes:
  (a) a differentially connected pair of current controlling devices;
  (b) a first control element in a first of said devices and a second control element in a second of the said devices, said devices being balanced when the voltage at said first control element equals the voltage at said second control element;
  (c) a common input for said pair of devices connected to receive an input waveform;
  (d) a capacitor connected to said input and to said second control element, said capacitor being charged as said input waveform rises to a maximum voltage to hold said second control element at said maximum voltage as said input waveform voltage commences to fall;
  (e) an output from said first device; and
  (f) a trigger circuit connected to said output, the voltage at said output exceeding the threshold value of said trigger circuit whenever the voltage at said first control element falls below the voltage at said second control element, whereby triggering of said trigger circuit coincides with said input waveform falling away from said maximum.

5. Focusing means according to claim 1, further comprising:
  (a) a television camera tube for scanning said image to provide said signal;
  (b) deflection control means for controlling said scanning;
  (c) means connected to said deflection control means for inserting synchronizing pulses into said signal to provide a composite video signal; and
  (e) a gating circuit receiving said composite video signal and replacing said synchronizing pulses by a slowly changing waveform before applying said signal to said band-pass filter.

6. Focusing means according to claim 1, further comprising:
  (a) an electron beam scanning tube for scanning said final image to provide said signal, a target of said tube being included within a microscope vacuum envelope and conductivity of the target varying in accordance with said final electron image;
  (b) deflection control means for controlling said scanning;
  (c) means connected to said deflection control means for inserting said synchronizing pulses into said signal to provide a composite video signal;
  (d) a television receiver tube for monitoring said image reproduced by said composite video signal; and
  (e) a gating circuit receiving said composite video signal and replacing said synchronizing pulses by a slowly changing waveform before applying said signal to said band-pass filter.

7. Focusing means according to claim 6, including means for intensifying said final image of said electron microscope prior to the scanning of the said image.

8. Focusing means according to claim 1, including means for intensifying said final image of said electron microscope, said intensifying means including a final fluorescent screen for receiving an intensified image, said screen also comprising a target of a television camera tube whereby said means for scanning said image comprises an electron beam of the tube.

9. Focusing means according to claim 1, including means for squaring the amplitudes of said filtered signal to remove negative half cycles.

10. Focusing means according to claim 1, wherein said frequency pass-band is within a range of 40–60% of said upper cutoff frequency.

11. Focusing means according to claim 2, wherein said frequency pass-band is within a range of 40–60% of said upper cutoff frequency.

12. Focusing means according to claim 4, wherein said frequency pass-band is within a range of 40–60% of said upper cutoff frequency.

13. Focusing means according to claim 5, wherein said frequency pass-band is within a range of 40–60% of said upper cutoff frequency.

14. Focusing means according to claim 6, wherein said frequency pass-band is within a range of 40–60% of said upper cutoff frequency.

References Cited

UNITED STATES PATENTS

| | | | |
|---|---|---|---|
| 2,464,396 | 3/1949 | Hillier | 315—31 |
| 2,999,436 | 9/1961 | Faulhaber. | |
| 3,218,431 | 11/1965 | Stauffer | 250—49.5 |

ROBERT L. GRIFFIN, Primary Examiner

H. W. BRITTON, Assistant Examiner

U.S. Cl. X.R.

178—7.2; 250—49.5; 315—22, 31

UNITED STATES PATENT OFFICE
CERTIFICATE OF CORRECTION

Patent No. 3,509,275                    Dated April 28, 1970

Inventor(s) Edward M. Deeley, Claude D. Curling, & John A. Temple

It is certified that error appears in the above-identified patent and that said Letters Patent are hereby corrected as shown below:

Column 1, line 38, "On" should be ---One---
"        "  line 40, "contracts" should be ---contrast---

Column 2, line 30, "taget" should be ---target---

Column 5, Claim 2, line 6, "means" should be ---mean---

SIGNED AND
SEALED
SEP 8 - 1970

(SEAL)
Attest:

Edward M. Fletcher, Jr.
Attesting Officer

WILLIAM E. SCHUYLER, JR.
Commissioner of Patents